United States Patent [19]

Kuze

[11] Patent Number: 5,357,422
[45] Date of Patent: Oct. 18, 1994

[54] READ-ONLY SEQUENCE CONTROLLER

[76] Inventor: Yoshikazu Kuze, 31-3, Higashimagome 1-chome, Ohta-ku, Tokyo, Japan

[21] Appl. No.: 151,120

[22] Filed: Nov. 12, 1993

[30] Foreign Application Priority Data

Nov. 16, 1992 [JP] Japan .................. 4-350067

[51] Int. Cl.⁵ ................ G05B 11/01; G06F 15/46
[52] U.S. Cl. .................... 364/143; 364/140; 364/184; 377/16
[58] Field of Search ........... 364/140, 141, 143, 184, 364/186; 307/590, 592, 596; 328/72; 371/14; 365/236; 377/2, 16, 26, 44

[56] References Cited

U.S. PATENT DOCUMENTS

| | | | |
|---|---|---|---|
| 3,829,842 | 8/1974 | Langdon et al. | 364/143 X |
| 4,107,779 | 8/1978 | Fisk et al. | 364/143 X |
| 4,815,112 | 3/1989 | Kuze | 377/16 |
| 4,827,396 | 5/1989 | Taniguchi | 364/143 X |

Primary Examiner—Joseph Ruggiero
Attorney, Agent, or Firm—Beveridge, DeGrandi, Weilacher & Young

[57] ABSTRACT

A read-only sequence controller has a main circuit and a sub-circuit operated by a command signal from the main circuit at a predetermined cycle time. The cycle time of the main circuit is longer than the sub-circuit in order to control the sub-circuit. A sensor is provided on an outlet of a machine for detecting a discharge of a work at every cycle end and producing a discharge signal which is fed to the sub-circuit. In normal operation, the sub-circuit is re-started in response to the discharge signal and the command signal from the main circuit. When abnormality occurs, the sensor does not produce the discharge signal. In response to absence of the discharge signal and to the command signal, a stop control circuit produces stop signals to stop the main circuit and the sub-circuit.

3 Claims, 4 Drawing Sheets

READ-ONLY SEQUENCE CONTROLLER

BACKGROUND OF THE INVENTION

The present invention relates to a read-only sequence controller for sequentially controlling a manufacturing machine in a factory.

Generally, a compact sequence controller is operated by an external signal and a plurality of sensors attached to various portions of the machine in the factor in order to detect abnormalities of products or failures of the machine.

However, when the machine produces defective goods, it is difficult to quickly deal with the trouble. In the case of a press machine, a costly die or machine may be damaged due to delay of recovery of the machine.

SUMMARY OF THE INVENTION

An object of the present invention is to provide a compact read-only sequence controller where an operation of the machine may be immediately stopped when abnormality occurs, thereby preventing damage of the machine and tools.

According to the present invention, there is provided a read-only sequence controller comprising a main circuit and a sub-circuit operated by a command signal from the main circuit at a predetermined cycle time. The cycle time of the main circuit is longer taken the sub-circuit in order to control the sub-circuit. A sensor is provided on an outlet of the machine for detecting a discharge of a work at every cycle end and producing a discharge signal which is fed to the sub-circuit. In normal operation, the sub-circuit is re-started by the command signal from the main circuit. When abnormality occurs, the sensor does not produce the discharge signal and a stop control circuit produces stop signals to stop the main circuit and the sub-circuit.

These and other objects and features of the present invention will become more apparent from the following detailed description with reference to the accompanying drawings.

DETAILED DESCRIPTION OF THE PREFERRED EMBODIMENTS

Figure 1:
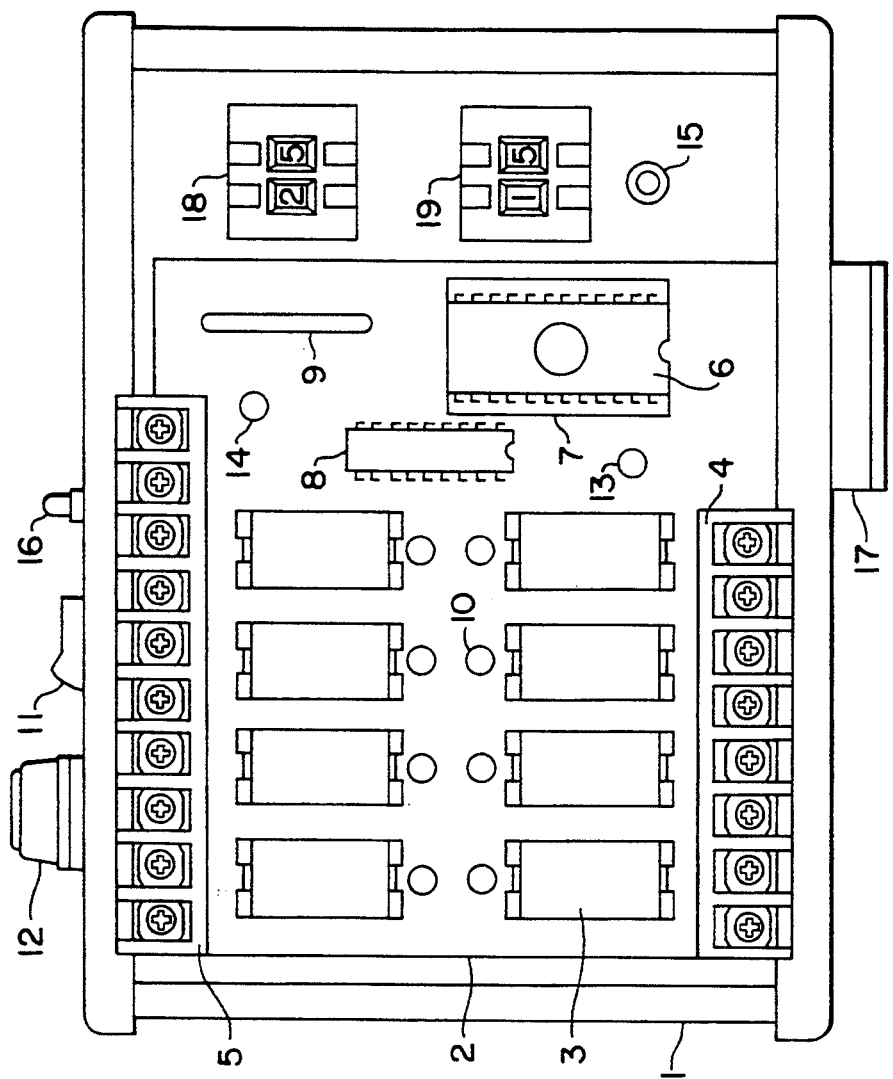
FIG. 1 is a plan view of a read-only sequence controller according to the present invention.
Figure 2:
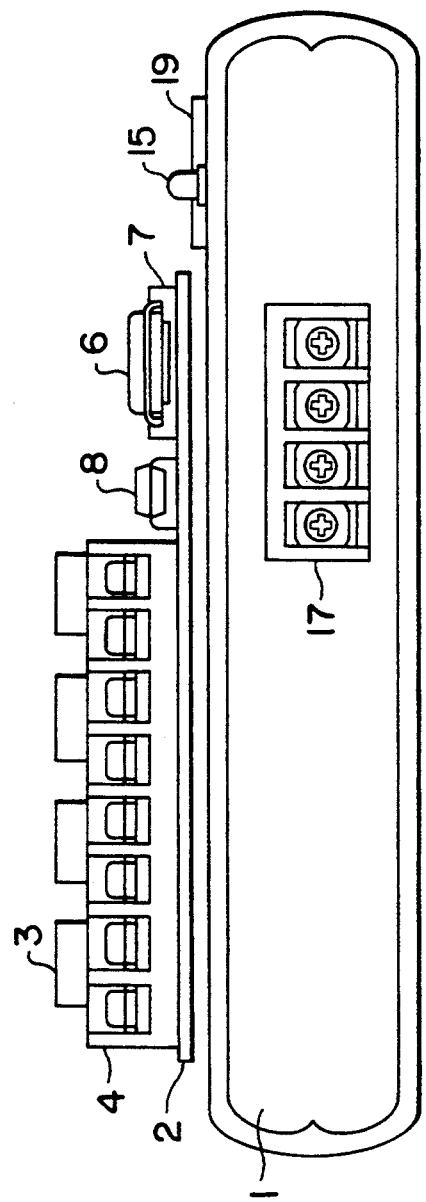
FIG. 2 is a side view of the controller of FIG. 1.

Referring to FIGS. 1 and 2, a read-only sequence controller of the present invention comprises a read clock pulse control unit 1 having a supply source and an output relay unit 2 mounted on the clock pulse control unit 1.

The output relay unit 2 comprises a board detachably secured to the control unit 1. A number of relays 3, such as eight relays are mounted on the board. Terminal units 4 and 5 are disposed adjacent to the relay unit 2. The terminal unit 4 has eight terminals for four relays and the terminal unit 5 has ten terminals for the other four relays and for an alternating current power supply. An EPROM 6 is detachably fixed to a connector 7. Numeral 8 is a transistor array, and 9 is a connector for the clock pulse control unit 1 and the output relay unit 2. A display 10 employed with an LED is provided by displaying the operation of each relay.

On the read clock pulse control unit 1, a power switch 11, fuse 12 pilot lamp 13 with an LED, abnormality display 14 with an LED, start switch 15 reset switch 16, input terminals 17, a preset code switch 18 for a main circuit A, and a present code switch 19 for a sub-circuit B are provided. The preset code switch 18 displays digits of two figures for one cycle time and is adapted to select a necessary cycle time. If the unit time for the digits is 0.1 second, digits "25" of preset code switch 18 shown in FIG. 1 signify a cycle time of 2.5 seconds being set. Similarly, the preset code switch 19 displays digits "15" which signify a cycle time of 1.5 seconds.

Figure 3:
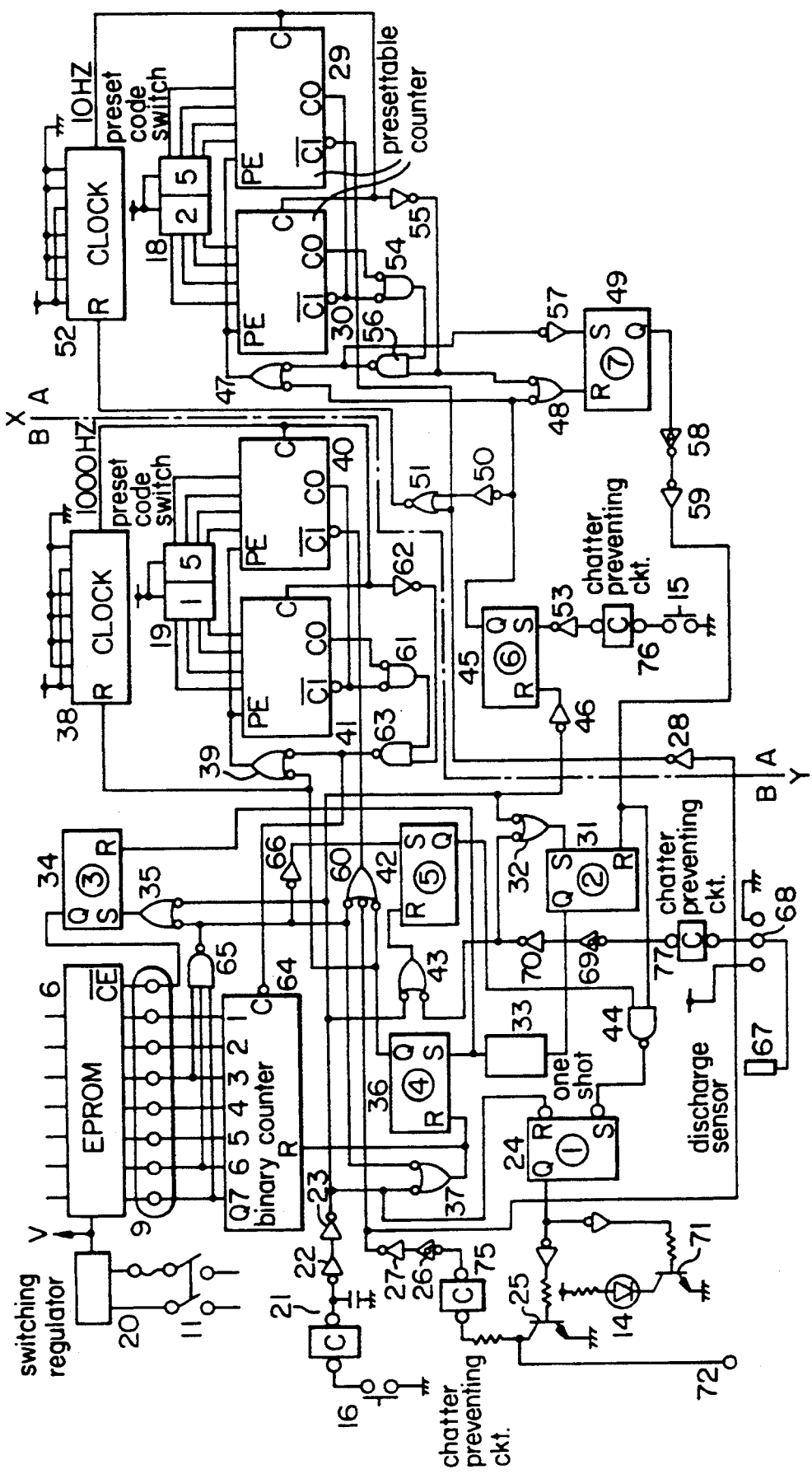
FIG. 3 shows a circuit of a control unit of the present invent.

Referring to FIG. 3 showing a circuit of the controller, the circuit comprises the main circuit A and the sub-circuit B which are divided by a dot-dash line in FIG. 3. The cycle time of the main circuit A is set to 2.5 seconds by the present code switch 18. The cycle time of the sub-circuit B is set to 1.5 seconds by the preset code switch 19. When power switch 11 and reset switch 16 are depressed, the supply voltage Vcc is obtained by a switching regulator 20, and a system supply voltage is applied to an initial reset circuit 21, so that an inverter 22 produces an output at a 1 level. The output is inverted into a 0 level by an inverter 23 to reset or set each of R-S latches of first to sixth flip-flops.

When a first flip-flop 24 is reset, a transistor 25 is turned off, causing the output of an inverter 27 to go to 1 through a chatter preventing circuit 75, and Schmitt circuit 26. An output of an inverter 28 of the main circuit A is changed to "0" which is applied to a $\overline{CI}$ input of a presettable down counter 29 so that presettable down counters 29, 30 becomes count enable states.

A second flip-flop 31 is set through a 2-input NAND gate 32. A one-shot pulse "0" appears at an output of a one-shot pulse generating circuit 33.

When a third flip-flop 34 is set through a 2-input NAND gate 35, a 1 output is applied to an input $\overline{CE}$ of the EPROM 6 through the connector 9 so that the EPROM 6 stops producing data.

When a fourth flip-flop 36 is reset through a 2-input NAND gate 37, the output at a 0 level is applied to a reset input R of a clock pulse generating circuit 38 to stop the operation thereof. The 0-level output is further applied to inputs PE of presettable down counters 40 and 41 through a 2-input NAND gate 39 to preset the digit "15" of preset code switch 19 in counters 41 and 40, respectively.

When a fifth flip-flop 42 is reset through a 2-input NAND gate 43, an output at a 0 level is applied to a 2-input NAND gate 44 as an abnormality signal output gate.

When a sixth flip-flop 45 in the main circuit A is reset through an inverter 46, an output at a 0 level is produced, and an output at a 1 level is applied to inputs PE of presettable down counters 29 and 30 through a 2-input NAND gate 47 to preset the digit "25" of preset code switch 18 in counters 30 and 29, respectively.

The 0 output of the sixth flip-flop 45 is further applied to a seventh flip-flop 49 through a 2-input NAND gate 48 and to a clock pulse generating circuit 52 provided with a crystal oscillator through an inverter 50 and a 2-input NOR gate 51 to stop producing clock pulses.

When the start switch 15 of the main circuit A is depressed, the sixth flip-flop 45 is set through a chatter preventing circuit 76 and an inverter 53. Thus, an output at a 1 level is applied to a clock pulse generating circuit 52 through the inverter 50 and the 2-input NOR gate 51.

The output of the clock pulse generating circuit 52 provided with a crystal oscillator, is 10 Hz, as clock pulses. The clock pulses are applied to clock lines C of the presettable down counters 29 and 30, respectively.

Each time one clock pulse is applied to the presettable counter 29, the preset count therein decreases by one. When 25 clock pulses are applied to the presettable counters, both inputs of a 2-input NOR gate 54 go to a "0". Thus, the 2-input NOR gate 54 produces one read clock pulse.

On the other hand, when an inverter 55 produces output "1", a 2-input NAND gate 56 outputs a "0". Thus, a terminal PE of each presettable counter is applied with a pulse "1" through the 2-input NAND gate 47. At this time, the "25" of the preset code switch 18 is preset again in the presettable down counters 29 and 30.

The output "0" of the gate 56 is further applied to the set terminal of the seventh flip-flop 49 through an inverter 57. A command signal of 1 level is applied from the seventh flip-flop 49 to the sub-circuit B through a Schmitt circuit 58 and an inverter 59. At a moment, the output of the inverter 55 is inverted into "0" to reset the seventh flip-flop 49 through a 2-input NAND gate 48. Thus, one command signal is produced. The command signal is continuously applied to a reset terminal R of the second flip-flop 31 of the sub-circuit B at every 2.5 seconds.

When the second flip-flop 31 is reset, an output at a 0 lever is applied to the one-shot pulse generating circuit 33. A one-shot pulse "1" appears at the output of the circuit 33. This one-shot pulse "1" is applied to a set terminal S of the fourth flip-flop 36 to produce an output 1 which is applied to the clock pulse generating circuit 38. The output thereof is 1000 Hz, as clock pulses. The clock pulses are applied to clock lines C of the presettable down counters 40 and 41, respectively.

The output "1" of the fourth flip-flop 36 is applied to a 3-input NAND gate 60, and three inputs thereof go to "1". The gate 60 produces an output at a 0 level which is applied to the terminal $\overline{CI}$ of the presettable down counter 40 to produce clock pulses.

Each time one clock pulse is applied to the presettable counter, the preset count therein decreases by one. When 15 clock pulses are applied to the presettable counters, both inputs of a 2-input NOR gate 61 go to a "0". Thus, the 2-input NOR gate 61 produces one read clock pulse.

The one-shot pulse "1" of the one-shot pulse generating circuit 33 is further applied to the reset terminal of the third flip-flop 34, the output 0 thereof is applied to the terminal $\overline{CE}$ of the EPROM 6 through the connector 9 and the EPROM in turn is set to an output state.

On the other hand, when the output of the 2-input NOR gate 61 goes to "1", a 2-input NAND gate 63 outputs a "0" when an inverter 62 produces output "1". Thus, terminal PE of each presettable counter is applied with a pulse "1" through the 2-input NAND gate 39. At this time, the "15" of the preset code switch 19 is preset again in the presettable down counters 40 and 41.

Thus, every time 15 clock pulses are applied to the presettable counters 40 and 41, one read clock pulse is generated from the gate 63. The read clock pulse is applied to the clock line C of the binary counter 64. Accordingly, the binary counter 64 produces outputs through address lines Q1 to Q7, so that the outputs are applied to the address in the EPROM 6 through the connector 9.

On the other hand, the EPROM 6 produces a data signal in response to the address signals, so that respective actuators of the machine are operated through relay unit 2.

Time of one cycle is decided by the number of read clock pulses. Operation in the case of 100 read clock pulses in one cycle will be explained hereinafter.

In order to produce the one-cycle end signal upon 100 read clock pulses, address lines Q3, Q6 and Q7 of the binary counter 64 are selected as the inputs of a 3-input NAND gate 65. Since the binary number of "100" is 1100100, when the 100th read clock pulse is applied to the input of the binary counter 65, outputs on the address lines Q3, Q6 and Q7 go to "1" and the 3-input NAND gate 65 produces a one-cycle end signal "0". Since the clock pulse of the clock pulse generating circuit 38 is produced at 1000 Hz, the cycle time of the sub-circuit B is 1.5 seconds.

When one cycle is completed, the third flip-flop 34 is set through the 2-input NAND gate 35, so that an output 1 is applied to $\overline{CE}$ of the EPROM 6 to stop producing the output. The fifth flip-flop 42 is set through an inverter 66. A first input of the abnormality signal output gate of 2-input NAND gate 44 is changed to "1". The one cycle end signal 0 is applied to the 3-input NAND gate 60, so that a signal at the "1" level is applied to $\overline{CI}$ of counter 40 through the gate 60. The fourth flip-flop 36 is reset through the 2-input NAND gate 37 to stop the clock pulse generating circuit 38. Thus, each of the actuators of the machine stops.

When the work product after the manufacturing process passes the sensor 67 provided at an outlet of the machine, a signal having a 0 level is applied to the set terminal of the second flip-flop 31 through an input terminal 68, chatter preventing circuit 77, Schmitt circuit 69, inverter 70 and 2-input NAND gate 32. The fifth flip-flop 42 is reset through 2-input NAND gate 43 to change the first input signal of the abnormality signal output gate of 2-input NAND gate 44 into a "0". Further, the second flip-flop 31 is reset by the command signal of the main circuit A at the next 2.5 seconds, thereby re-starting the operations of the sub-circuit B and actuators of the machine. The operations of the actuators are continued unless an abnormality occurs.

When a signal from the sensor 67 is not applied to the second flip-flop 31 at the end of the one cycle operation, and the command signal is applied to the second flip-flop 31, both of the inputs of abnormality signal output gate of 2-input NAND gate 44 go to "1" to produce an output "0" so that first flip-flop 24 is set. Thus, the transistors 71 and 25 are turned on. The abnormality display 14 emits the light and the inverter 27 produces the output 0. A signal having 1 level which is inverted through the 3-input NAND gate 60 is applied to $\overline{CI}$ of the presettable down counter 40 to stop clock pulses. The output of the inverter 28 is changed to "1" which is applied to the presettable down counter 29 to stop the operations of both counters. The 2-input NOR gate 51 produces the output "0" to stop the clock pulse generating circuit 52. Thus, the output of the clock pulse stops and the machine completely stops.

After inspection and repair of the machine are done, the reset switch 16 is depressed and the start switch 15 is depressed, so that the machine starts operation.

A terminal 72 is provided for connecting other sequence controllers so as to stop the operation thereof.

Figure 4:
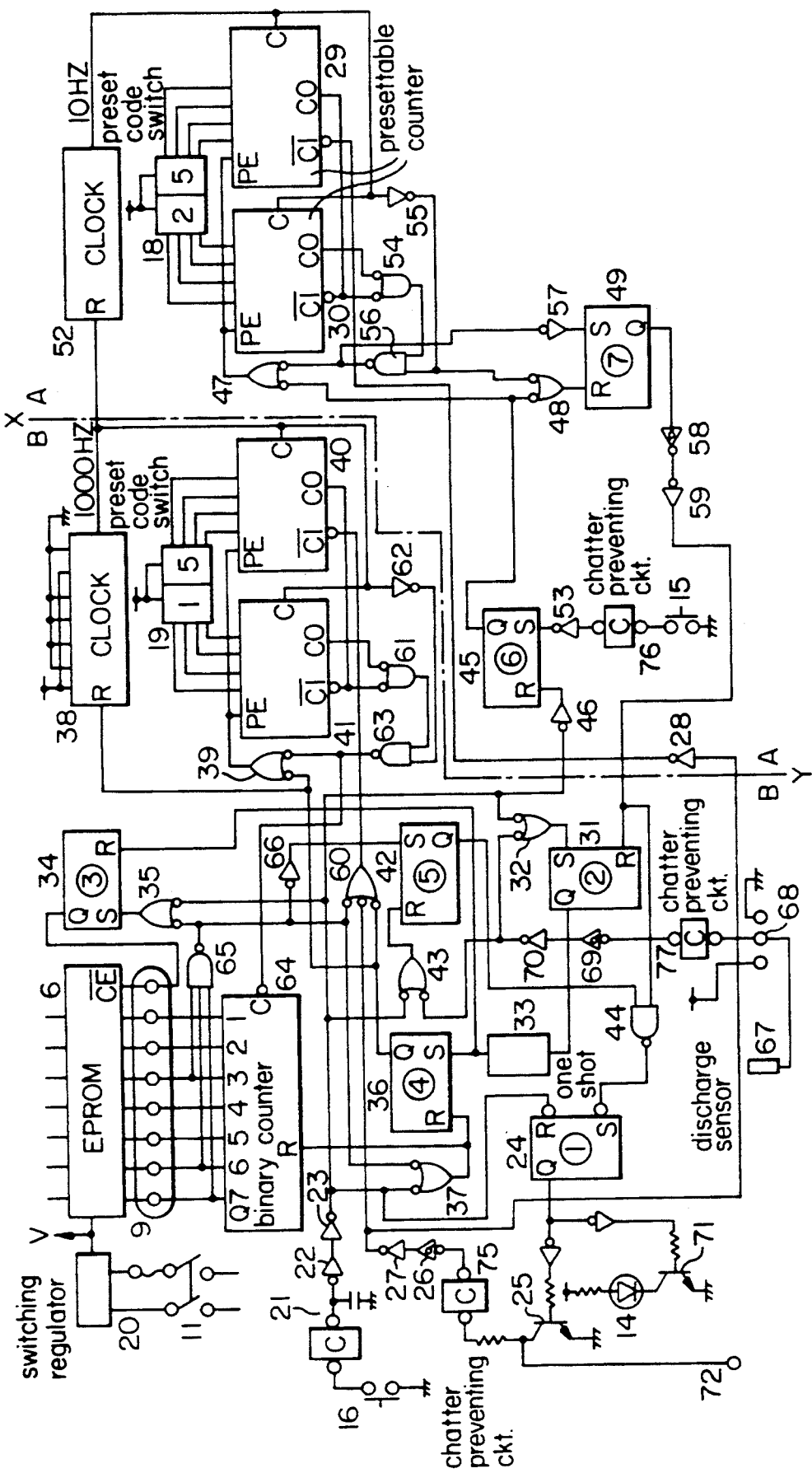
FIG. 4 shows a circuit of another embodiment.

FIG. 4 shows another embodiment. The output of the clock pulse generating circuit 52 of the main circuit A is obtained by dividing the output of the clock pulse generating circuit 38 of the sub-circuit B into 1/100. The other structures of this embodiment are the same as the previous embodiment of FIG. 3 except for the inverter 50 and the 2-input NOR gate 51, and the descriptions thereof are omitted.

The sequence read-only controller of the present invention has a weight of 420 g. The controller is mounted on a press machine of a capacity of 160 t for automatically operating the machine. The machine is sequentially operated at three processes with a full automatic control without abnormality.

In accordance with the present invention, the sensor is provided on the outlet of the machine for detecting abnormality at every one cycle. When an abnormality occurs, the stop control circuit produces stop signals to stop the machine. In a press machine, the machine is stopped at a top dead point. Therefore, there is no danger because of the full automatic control.

The sequence controller can be used in various machines such as an assembling machine and a testing machine to provide effective automatic operations.

While the invention has been described in conjunction with preferred specific embodiment thereof, it will be understood that this description is intended to illustrate and not limit the scope of the invention, which is defined by the following claims.

What is claimed is:

1. A read-only sequence controller for controlling operation of a machine, having
   a main circuit and a sub-circuit;
   said main circuit comprising:
   a first clock pulse generating circuit for producing first clock pulses, a first presettable counter for counting the first clock pulses and for producing a command signal after every preset count has been reached;
   said sub-circuit comprising:
   a memory, a second clock pulse generating circuit for producing second clock pulses, a second presettable counter for counting the second clock pulses and for producing a read clock pulse after every preset count has been reached, a binary counter for counting the read clock pulse and for producing outputs for addressing said memory, so that the memory produces data outputs, relays responsive to the data outputs for operating the machine, and a control circuit for controlling start and stop operations of the counters,
   the control circuit comprising:
   a start control circuit responsive to the command signal for starting said second clock pulse generating circuit, second presettable counter, and binary counter;
   a sensor detecting a discharge of a work from the machine and for producing a discharge signal;
   re-start control circuit responsive to a count end signal of said binary counter, to said discharge signal, and to said command signal, for re-starting said second clock pulse generating circuit, second presettable counter, and binary counter;
   a stop control circuit responsive to an absence of said discharge signal, to said count end signal for producing stop signals, and to said command signal for stopping said first and second presettable counters.

2. The read-only sequence controller according to claim 1 wherein:
   a first cycle time from the start of counting the first clock pulses to the production of the command signal in the main circuit is longer than a second cycle time from the start of counting the second clock pulses to the production of the count end signal.

3. The read-only sequence controller according to claim 1 wherein:
   said first clock pulse generating circuit produces the first clock pulses by dividing the second clock pulses from the second clock pulse generating circuit.

* * * * *